US007003026B2

(12) United States Patent
Ilani

(10) Patent No.: US 7,003,026 B2
(45) Date of Patent: Feb. 21, 2006

(54) AGGREGATE THROUGHPUT CONTROL IN A MODEM POOL ENVIRONMENT

(75) Inventor: Ishai Ilani, Modiin (IL)

(73) Assignee: Actelis Networks Inc, Fremont, CA (US)

( * ) Notice: Subject to any disclaimer, the term of this patent is extended or adjusted under 35 U.S.C. 154(b) by 825 days.

(21) Appl. No.: 09/899,848

(22) Filed: Jul. 9, 2001

(65) Prior Publication Data

US 2003/0007506 A1 Jan. 9, 2003

(51) Int. Cl.
*H04B 1/38* (2006.01)
*H04L 5/16* (2006.01)

(52) U.S. Cl. ........................ 375/222; 375/219; 375/257

(58) Field of Classification Search ................ 375/219, 375/222, 377; 713/201
See application file for complete search history.

(56) References Cited

U.S. PATENT DOCUMENTS 6,021,120 A 2/2000 Beyda et al.
6,044,107 A * 3/2000 Gatherer et al. ............ 375/222
6,510,162 B1 * 1/2003 Fijolek et al. .............. 370/432
6,560,197 B1 * 5/2003 LeVieux et al. ............ 370/231
6,647,058 B1 * 11/2003 Bremer et al. .............. 375/222
2002/0010866 A1 * 1/2002 McCullough et al. ....... 713/201

OTHER PUBLICATIONS

U.S. Appl. No. 09/510,550, filed Feb. 22, 2000, Barlev et al.

* cited by examiner

*Primary Examiner*—Stephen Chin
*Assistant Examiner*—Erin M. File
(74) *Attorney, Agent, or Firm*—Pearl Cohen Zedek Latzer, LLP

(57) ABSTRACT

In a system including a first and a second modem pool, each modem pool including a plurality of modems, where each modem in one of the modem pools is paired with a corresponding modem in the other the modem pools, a method for controlling aggregate throughput including initializing each of the modems at an outbound throughput and an inbound throughput, where the outbound and inbound throughputs of at least one of the modems are determined independently from one another, determining an aggregate outbound throughput each of the modem pools, and for each of the modem pools whose aggregate outbound throughput exceeds an associated optimal aggregate throughput, reducing the outbound throughput of any of the modems until the aggregate outbound throughput equals the optimal aggregate throughput.

16 Claims, 4 Drawing Sheets

AGGREGATE THROUGHPUT CONTROL IN A MODEM POOL ENVIRONMENT

FIELD OF THE INVENTION

The present invention relates to modem communications in general, and more particularly to methods and apparatus for controlling modem pools.

BACKGROUND OF THE INVENTION

Modem broadband communications systems are generally implemented as providing either asymmetric or symmetric service. In asymmetric service data is transmitted in one direction, typically downstream towards the customer premises, at a greater data rate than data is transmitted in the other direction, typically upstream towards the local exchange. Asymmetric services are used in environments such as the Internet, where the ratio between upstream and downstream throughput depends on the characteristics of the applications requiring data transmission. For example, downloading a picture or a movie from an ISP typically requires a large downstream throughput, while a much lower upstream throughput is used for sending data requests and acknowledgements. The typical ratio between upstream and downstream for such applications is about 1:10, ADSL modems and certain configurations of VDSL modems are designed to support asymmetric services, having a much higher downstream bandwidth than upstream bandwidths.

In symmetric service data is transmitted between two points at the same data rate. Symmetric service include T1 and E1 and their aggregates in the form of DS1 and DS3. Modems which are designed to support symmetric services include HDSL modems and some configurations of VDSL modems. Optical devices also are designed for symmetric transmission.

During the wake up process of a modem providing asymmetric service the modem typically determines both the maximum achievable upstream throughput and the maximum achievable downstream throughput give predefined SNR tolerances and a target asymmetric service ratio. The modem then sets the actual upstream throughput equal to the maximum achievable upstream throughput, and sets the actual downstream throughput equal to the maximum achievable downstream throughput. Thus, upstream throughput and downstream throughput are set independently to achieve maximum throughput in both directions.

In contrast to asymmetric service, during the wake up process of a modem providing symmetric service the modem typically determines both the maximum achievable upstream throughput and the maximum achievable downstream throughput, selects the lesser of these throughputs as the working throughput, and sets the actual upstream and downstream throughputs equal to the working throughput. As a result of this wake up process, bandwidth is often wasted in one of the two directions.

In an environment where one modem pool communicates with another modem pool, aggregate symmetric service may be provided by using only symmetric modems in each modem pool. Should a modem pool include asymmetric modems as well, aggregate symmetric service may nonetheless be provided by pairing two asymmetric modems in the one of the modem pools with a corresponding two asymmetric modems in the other modem pool and creating a single, full-duplex symmetrical circuit from the high-bandwidth channels of both asymmetric modems, such as is described in U.S. Pat. No. 6,021,120 to Beyda et al. Such a solution is disadvantageous, however, as each modem pool would require an even number of asymmetric modems. Should either modem pool have an odd number of asymmetric modems, the odd-numbered modems could not be used for aggregate symmetric service given the prior art. Furthermore, the low-bandwidth asymmetric channels would not be fully available for data transmission.

SUMMARY OF THE INVENTION

The present invention seeks to provide aggregate throughput control in a modem pool environment that overcomes disadvantages and limitations of the prior art.

In one preferred embodiment of the present invention involving modem pool to modem pool communication, each modem pool includes one or more symmetric modems and one or more asymmetric modems, or is entirely comprised of asymmetric modems. Aggregate symmetric service is achieved by having each pair of modems determine their throughput in each direction using conventional modem wake-up techniques. After aggregating the throughput information from all modems in each direction, the modem pool having greater aggregate outbound throughput reduces the outbound throughput of one or more of its individual asymmetric modems until the modem pool's aggregate outbound throughput equals its aggregate inbound throughput. This reduction may be effected using a variety of techniques, such as by reducing the modem's physical transmission bit rate, or by maintaining its physical bit rate while reducing the number of information bits per unit time, such by changing its modulation scheme (e.g., from PAN 32 to PAM 16), or by transmitting "junk" bits amidst the information bits. Alternatively, the "excess" modem outbound throughput (i.e. the amount of outbound throughput that a modem is supposed to reduce) may be used for redundancy bits to support increased error correction.

In one aspect of the present invention in a system including a first and a second modem pool, each modem pool including a plurality of modems, where each modem in one of the modem pools is paired with a corresponding modem in the other of the modem pools, a method is provided for controlling aggregate throughput including initializing each of the modems at an outbound throughput and an inbound throughput, where the outbound and inbound throughputs of at least one of tie modems are determined independently from one another, determining an aggregate outbound throughput for each of the modem pools, and for each of the modem pools whose aggregate outbound throughput exceeds an associated optimal aggregate throughput, reducing the outbound throughput of any of the modems until the aggregate outbound throughput equals the optimal aggregate throughput.

In another aspect of the present invention the initializing step includes initializing any of the modems asymmetrically.

In another aspect of the present invention the reducing step includes reducing where the optimal aggregate throughput equals the lesser of the aggregate outbound throughputs.

In another aspect of the present invention the reducing step includes using at least a portion of the outbound throughput of any of the modems for error correction.

In another aspect of the present invention the reducing step includes reducing the physical bit rate of any of the modems.

In another aspect of the present invention the reducing step includes transmitting junk bits in at least a portion of the outbound throughput of any of the modems.

In another aspect of the present invention in a system including a first and a second modem pool, each modem pool including a plurality of asymmetric modems, where each modem in one of the modem pools is paired with a corresponding modem in the other of the modem pools, a method is provided for controlling aggregate throughput including initializing each of the asymmetric modems at an outbound throughput and an inbound throughput, the outbound and inbound throughputs being determined independently from one another, determining an aggregate outbound throughput for each of the modem pools, and reducing the outbound throughput of any of the asymmetric modems in the first modem pool until the aggregate outbound throughput of the first modem pool equals the aggregate outbound throughput of the second modem pool.

In another aspect of the present invention the reducing step includes using at least a portion of the outbound throughput of any of the modems for error correction.

In another aspect of the present invention the reducing step includes reducing the physical bit rate of any of the modems.

In another aspect of the present invention the reducing step includes transmitting junk bits in at least a portion of the outbound throughput of any of the modems.

In another aspect of the present invention a modem pool communications system is provided incorporating aggregate throughput control, the system including a first and a second modem pool, where each of the modem pools includes a plurality of modems, where each of the modems in one of the modem pools is paired with a corresponding one of the modems in the other of the modem pools, where each of the modems is operative to initialize at an outbound throughput and an inbound throughput, and where at least one of the modems is operative to determine the outbound and inbound throughputs determined independently from one another, and means for controlling aggregate throughput, the means operative to define an aggregate outbound throughput for each of the modem pools, and for each of the modem pools whose aggregate outbound throughput exceeds an associated optimal aggregate throughput, reduce the outbound throughput of any of the modems until the aggregate outbound throughput equals the optimal aggregate throughput.

In another aspect of the present invention any of the modems is operative to initialize asymmetrically.

In another aspect of the present invention the means for controlling aggregate throughput is operative to reduce where the optimal aggregate throughput equals the lesser of the aggregate outbound throughputs.

In another aspect of the present invention the means for controlling aggregate throughput is operative to reduce by using at least a portion of the outbound throughput of any of the modems for error corrections.

In another aspect of the present invention the means for controlling aggregate throughput is operative to reduce by reducing the physical bit rate of any of the modems.

In another aspect of the present invention the means for controlling aggregate throughput is operative to reduce by transmitting junk bits in at least a portion of the outbound throughput of any of the modems.

In another aspect of the present invention a modem pool communications system is provided incorporating aggregate throughout control, the system including a first and a second modem pool, where each of the modem pools includes a plurality of asymmetric modems, where each of the modems one of the modem pools is paired with a corresponding one of the modems in the other of the modem pools, where each of the modems is operative to initialize at an outbound throughput and at inbound throughput, and where at least one of the modems is operative to determine the outbound and inbound throughput determined independently from one another, and means for controlling aggregate throughput, the means operative to determine an aggregate outbound throughput for each of the modem pools, and reduce the outbound throughput of any of the asymmetric modems in the first modem pool until the aggregate outbound throughput of the first modem pool equals the aggregate outbound throughput of the second modem pool.

On another aspect of the present invention the means for controlling aggregate throughput is operative to reduce by using at least a portion of the outbound throughput of any of the modems for error correction.

In another aspect of the present invention the means for controlling aggregate throughput is operative to reduce by reducing the physical bit rate of any of the modems.

In another aspect of the present invention the means for controlling aggregate throughput is operative to reduce by transmitting junk bits in at least a portion of the outbound throughput of any of the modems.

It is appreciated throughout the specification and claims that the term "information bit" refers to a bit whose primary function is to represent data, as opposed to, for example, filler or padding bits, or redundancy bits such as is used for error correction. It is appreciated throughout the specification and claims that the term "throughput" refers to the amount of information bits transmitted per unit time.

The disclosure of all patents, patent applications, and other publications mentioned in this specification and of the patents, patent applications, and other publications cited therein are hereby incorporated by reference in their entirety.

BRIEF DESCRIPTION OF DRAWINGS

The present invention will be understood and appreciated more fully from the following detailed description taken in conjunction with the appended drawings in which.

DETAILED DESCRIPTION OF PREFERRED EMBODIMENTS

Figure 1:
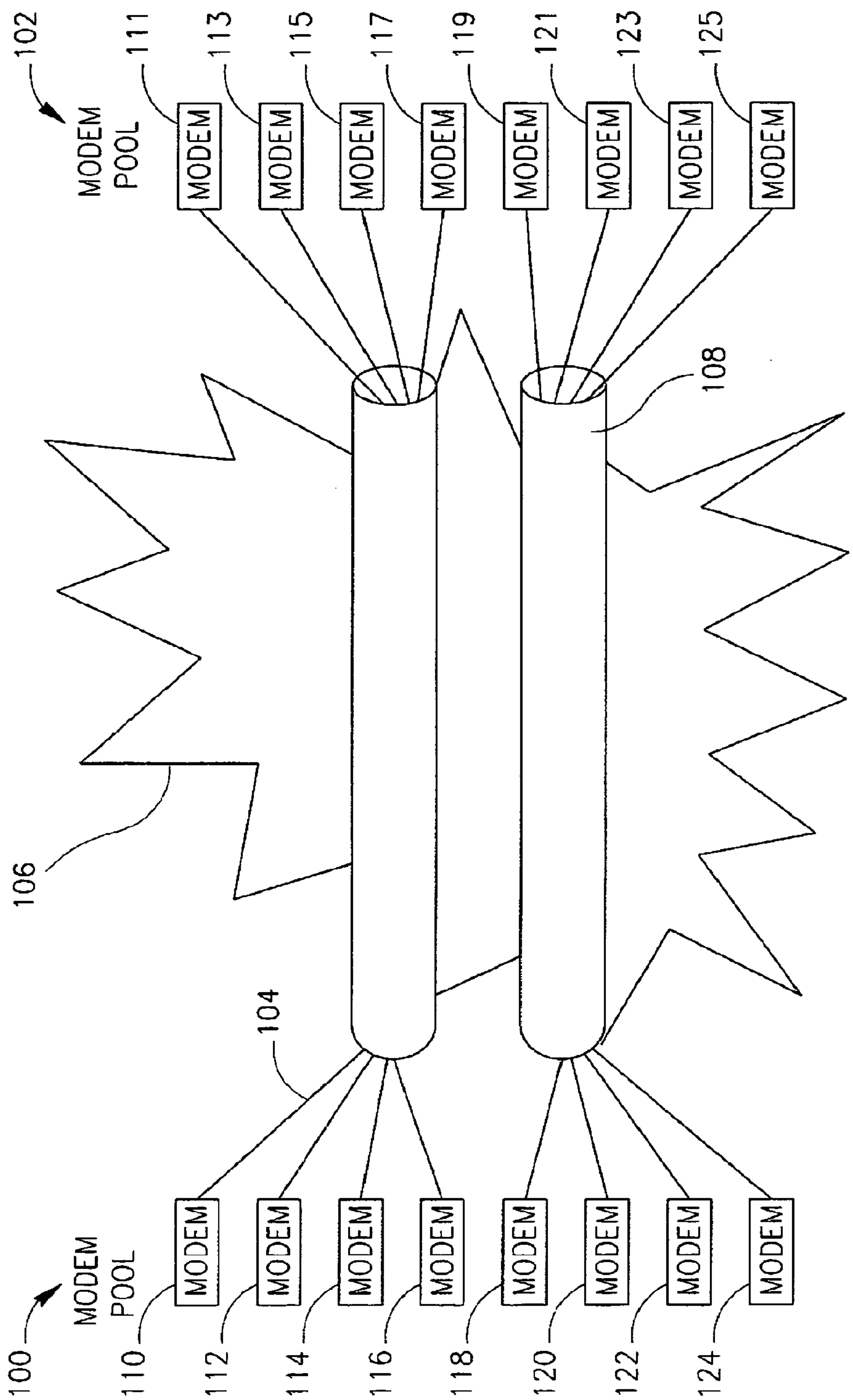
FIGS. 1 and 2 are conceptual illustrations of an exemplary modem pool arrangement useful in understanding the present invention.
Figure 2:
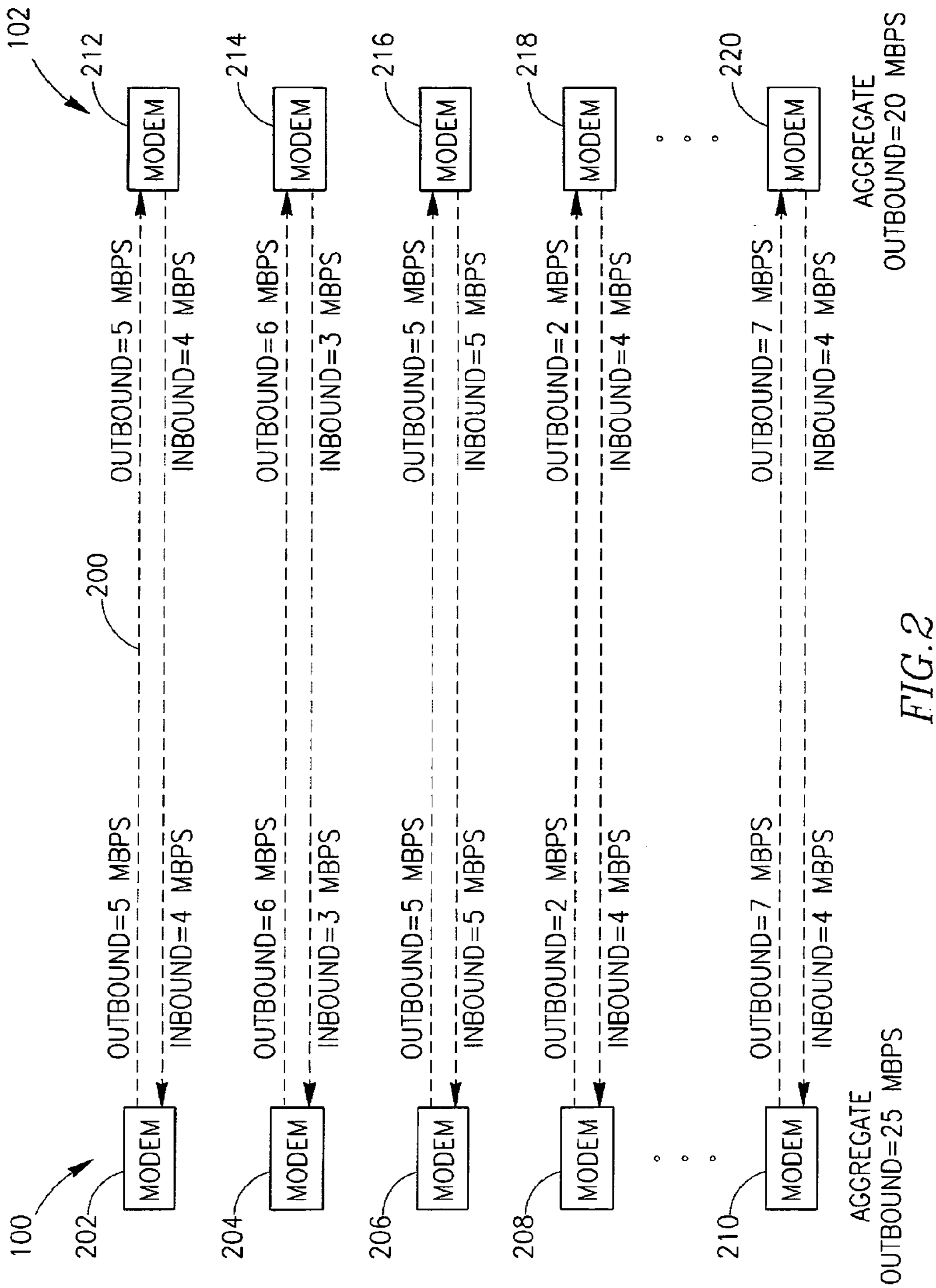

Reference is now made to FIGS. 1 and 2 which are conceptual illustrations of an exemplary modem pool arrangement useful in understanding the present invention. A first modem pool, generally referenced 100, and comprising a plurality of individual modems 110, 112, 114, 116, 118, 120, 122 and 124, is seen in communication with a second modem pool, generally referenced 102, and comprising a plurality of individual modems 111, 113, 115, 117, 119, 121, 123 and 125 via a plurality of connections 104 over a telephone network 106. Connections 104 are typically copper wire pairs arranged in one or more bundles 108. The modem pools preferably operate in a coordinated manner, such as is described in Applicant/assignee's U.S. patent application Ser. No. 09/510,550 filed Feb. 22, 2000, and entitled "High Speed Access System Over Copper Cable Plant," that claims priority from U.S. Provisional Application Ser. No. 60/121,228, filed Feb. 23, 1999, and entitled "Access Express-Very High Data Rate Communication Channels Over Copper," both hereby incorporated by reference in their entirety.

Referring now to FIG. 2, each modem in modem pool 100 including modems 202, 204, 206, 208 and 210, is shown paired and in communication with a corresponding modem in modem pool 102, including modems 212, 214, 216, 218 and 220, such that two communications channels 200, shown in dashed lines, are established between each modem pair. Throughput along any communications channel 200 may be expressed from the perspective of any given modem as outbound throughput of data transmitted by the modem and inbound throughput of data received by the modem.

Figure 3:
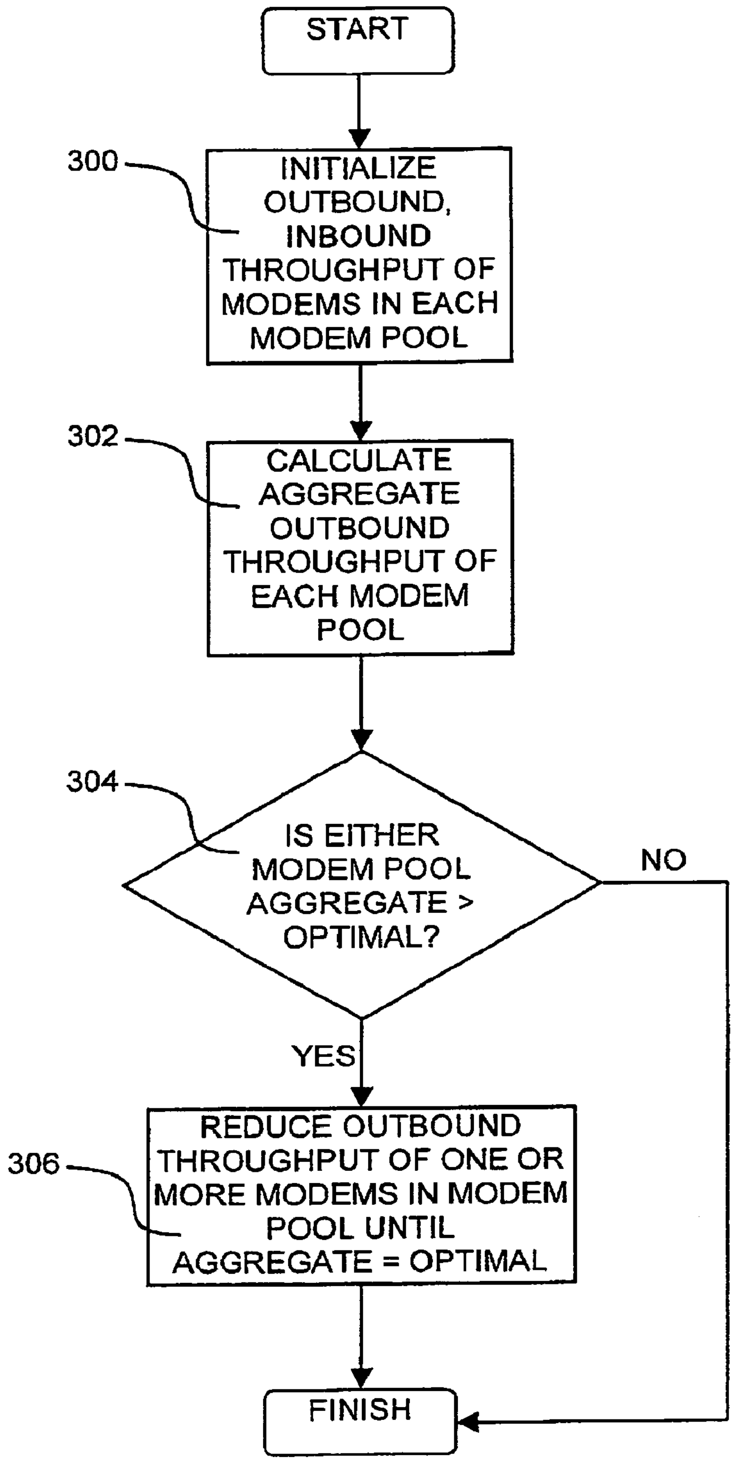
FIG. 3 is a flowchart illustration of a method for controlling aggregate throughput in modem pool to modem pool communications, operative in accordance with a preferred embodiment of the present invention.

Reference is now made to FIG. 3 which is a flowchart illustration of a method for controlling aggregate throughput in modem pool to modem pool communications, operative in accordance with a preferred embodiment of the present invention. In the method of FIG. 3, modem pools 100 and 102 typically each include one or more symmetric modems and one or more asymmetric modems, or may be entirely comprised of asymmetric modems. Each modes in modem pool 100 establishes communications with a corresponding modem in modem pool 102, and each pair of modems determine their outbound and inbound throughput using conventional modem wake-up or initialization techniques (step 300). Where one or both modems in a modem pair is/are symmetric, the modem's inbound and outbound throughput will typically be equal, being set as the minimum of both throughput values, such as is the case with modem 206, where after modem wake-up modem 206 is shown to have an outbound and inbound throughput of 5 Mbps. Where both modems in a modem pair are asymmetric, the modem's inbound and outbound throughput are determined independently from one another and will typically differ, such as is the case with modem 202, where after modem wake-up mode 202 is shown to have an outbound throughput of 5 Mbps and an inbound throughput of 4 Mbps for a difference of 1 Mbps.

Once both modem pools have been initialized, the aggregate outbound throughput of each modem pool is calculated as the sum of the outbound throughput of each modern in modem pools 100 and 102 (step 302). Thus, in the exemplary arrangement of FIG. 2, the aggregate outbound throughput of modem pool 100 is 25 Mbps, while the aggregate outbound throughput of modem pool 102 is 20 Mbps. After calculating the aggregate outbound throughput for a modem pool, the aggregated outbound throughput for the modem pool may be compared with an associated optimal aggregate throughput (step 304). The optimal aggregate throughput may be predefined or may be mathematically or otherwise related to the aggregate outbound throughput calculated for either modem pool. For example, were aggregate symmetric service is desired, the aggregate outbound throughputs calculated for each modem pool may be compared to determine which modem pool has the lower aggregate outbound throughput. Thus, the aggregate outbound throughput calculated for one modem pool may serve as the optimal aggregate throughput associated with the other modem pool. Alternatively, the aggregate outbound throughputs calculated for each modern pool may be compared to a single optimal aggregate throughput which may differ from the aggregate outbound throughput of both modem pools. Where aggregate asymmetric service is desired, each modem pool may have a different associated optimal aggregate throughput to which the modem pool's aggregated outbound throughput may be compared after initialization.

Figure 4:
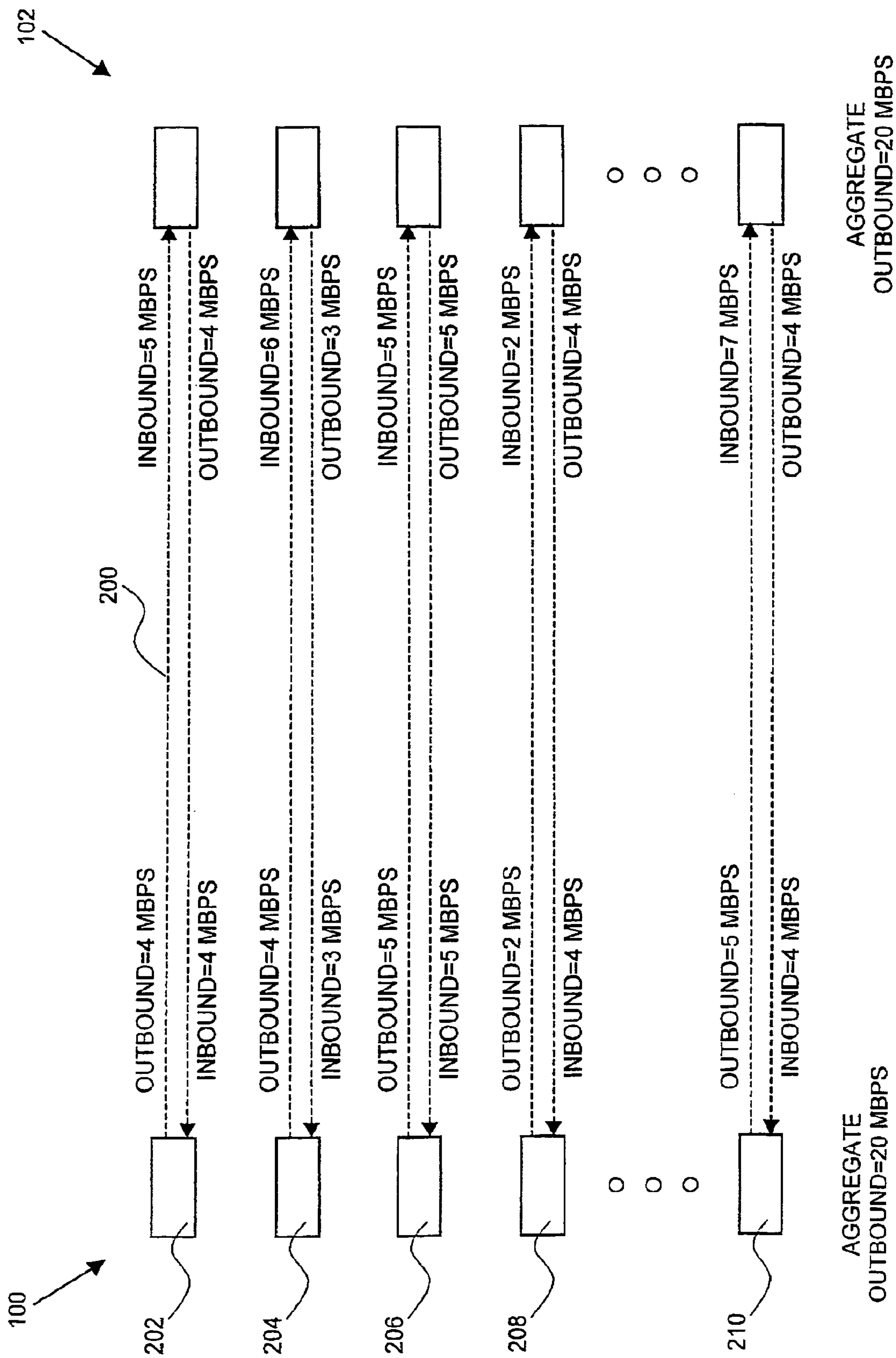
FIG. 4 is a conceptual illustration the exemplary modem pool arrangement of FIG. 2 after application of the method of FIG. 3.

Once the comparison between a modem pool's aggregated outbound throughput and its associated optimal aggregate throughput is made, where the modem pool's aggregate outbound throughput is greater than its associated optimal aggregate throughput, the outbound throughput of one or more of the modems in the modem pool is preferably reduced until the modem pool's aggregate outbound throughput equals its associated optimal aggregate throughput (step 306). This reduction may be effected using a variety of techniques, such as by reducing the modem's physical transmission bit rate, or by maintaining its physical bit rate while reducing the number of information bits per unit time, such by changing its modulation scheme (e.g., from PAM 32 to PAM 16), or by transmitting "junk" bits amidst the information bits. Alternatively, the "excess" modem outbound throughput (i.e. the amount of outbound throughput at a modem is supposed to reduce) may be used for redundancy bits to support increased error correction, Thus, for example, in FIG. 2 the outbound throughput of modem 202 may be reduced to 4 Mbps, modem 204 may be reduced to 4 Mbps, and modem 210 may be reduced to 5 Mbps, giving modem pool 100 a new aggregate outbound throughput of 20 Mbps, matching that of modem pool 102. The exemplary modem pool arrangement of FIG. 2 after application of the method of FIG. 3 may be seen with additional reference to FIG. 4.

It is appreciated that one or more of the steps of any of the methods described herein may be omitted or carried out in a different order than that shown, without departing from the true spirit and scope of the invention.

While the present invention has been described with reference to one or more specific embodiments, the description is intended to be illustrative of the invention as a whole and is not to be construed as limiting the invention to the embodiments shown. It is appreciated that various modifications occur to those skilled in the art that, while not specifically shown herein, are nevertheless within the true spirit and scope of the invention.

What is claimed is:

1. In a system comprising a first and a second modem pool, each modem pool including a plurality of modems, where each modem in one of said modem pools is paired with a corresponding modem in the other of said modem pools, a method for controlling aggregate throughput comprising:

initializing each of said modems at an outbound throughput and an inbound throughput, wherein said outbound and inbound throughputs of at least one of said modems are determined independently from one another;

determining an aggregate outbound throughput for each of said modem pools; and for each of said modem pools whose aggregate outbound throughput exceeds an associated optimal aggregate throughput, reducing the outbound throughput of any of said modems until said aggregate outbound throughput equals said optimal aggregate 15 throughput.

2. A method according to claim 1 wherein said initializing step comprises initializing any of said modems asymmetrically.

3. A method according to claim 1 wherein said reducing step comprises reducing where said optimal aggregate throughput equals the lesser of said aggregate outbound throughputs.

4. A method according to claim 1 wherein said reducing step comprises using at least a portion of the outbound throughput of any of said modems for error correction.

5. A method according to claim 1 wherein said reducing step comprises reducing the physical bit rate of any of said modems.

6. In a system comprising a first and a second modem pool, each modem pool including a plurality of asymmetric modems, where each modem in one of said modem pools is paired with a corresponding modem in the other of said modem pools, a method for controlling aggregate throughput comprising:

initializing each of said asymmetric modems at an outbound throughput and an inbound throughput, said outbound and inbound throughputs being determined independently from one another;

determining an aggregate outbound throughput for each of said modem pools; and reducing the outbound throughput of any of said asymmetric modems in said first modem pool until said aggregate outbound throughput of said first modem pool equals said aggregate outbound throughput of said second modern pool.

7. A method according to claim 6 wherein said reducing step cornprises using at least a portion of the outbound throughput of any of said modems for error correction.

8. A method according to claim 6 wherein said reducing step comprises reducing the physical bit rate of any of said modems.

9. A modem pool communications system incorporating aggregate throughput control, the system comprising:

a first and a second modem pool, wherein each of said modem pools includes a plurality of modems, wherein each of said modems in one of said modem pools is paired with a corresponding one of said modems in the other of said modem pools, wherein each of said modems is operative to initialize at an outbound throughput and an inbound throughput, and wherein at least one of said modems is operative to determine said outbound and inbound throughputs determined independently from one another, and means for controlling aggregate throughput, said means operative to:

determine an aggregate outbound throughput for each of said modem pools; and for each of said modem pools whose aggregate outbound throughput exceeds an associated optimal aggregate throughput, reduce the outbound throughput of any of said modems until said aggregate outbound throughput equals said optimal aggregate throughput.

10. A system according to claim 9 wherein any of said modems is operative to initialize asymmetrically.

11. A system according to claim 9 wherein said means for controlling aggregate throughput is operative to reduce where said optimal aggregate throughput equals the lesser of said aggregate outbound throughputs.

12. A system according to claim 9 wherein said means for controlling aggregate throughput is operative to reduce by using at least a portion of the outbound throughput of any of said modems for error correction.

13. A system according to claim 9 wherein said means for controlling aggregate throughput is operative to reduce by reducing the physical bit rate of any of said modems.

14. A modem pool communications system incorporating aggregate throughput control, the system comprising:

a first and a second modem pool, wherein each of said modem pools includes a plurality of asymmetric modems, wherein each of said modems in one of said modem pools is paired with a corresponding one of said modems in the other of said modem pools, wherein each of said modems is operative to initialize at an outbound throughput and an inbound throughput, and wherein at least one of said modems is operative to determine said outbound and inbound throughputs determined independently from one another; and means for controlling aggregate throughput, said means operative to:

determine an aggregate outbound throughput for each of said modem pools; and reduce the outbound throughput of any of said asymmetric modems in said first modem pool until said aggregate outbound throughput of said first modem pool equals said aggregate outbound throughput of said second modem pool.

15. A system according to claim 14 wherein said means for controlling aggregate throughput is operative to reduce by using at least a portion of the outbound throughput of any of said modems for error correction.

16. A system according to claim 14 wherein said means for controlling aggregate throughput is operative to reduce by reducing the physical bit rate of any of said modems.

* * * * *